Jan. 23, 1945.  C. HOLLERITH  2,367,776

STEM ASSEMBLY

Filed June 17, 1943

Inventor
CHARLES HOLLERITH
By Beaman & Langford
Attorneys

Patented Jan. 23, 1945

2,367,776

UNITED STATES PATENT OFFICE 2,367,776

STEM ASSEMBLY

Charles Hollerith, Jackson, Mich., assignor to Hayes Industries, Inc., Jackson, Mich., a corporation of Michigan Application June 17, 1943, Serial No. 491,175

5 Claims. (Cl. 60—54.6)

The present invention relates to hollow flexible tubes having a tubular stem providing communication with the interior thereof, and more particularly to expander tubes for hydraulic brakes.

Hydraulic expander tubes for hydraulic brakes of the character employing an expander tube are usually provided with a tubular stem providing communication with the interior of the expander tube. The stem is conventionally clamped to the tube by a nut threaded to the portion of the stem adjacent the tube. The stem projects through an opening in the rim supporting the tube and a nut on the outside of the rim clamps the tube to the rim. Such a construction is not wholly desirable for the reason that should the nut clamping the stem to the tube become loosened, it is necessary to remove the tube from the rim in order to tighten the nut. According to the present invention, the nut clamping the stem to the tube may be tightened without removing the tube from the rim. This result is accomplished by projecting the stem clamping nut through the rim and providing a structure on the outside of the rim for driving engagement with the stem clamping nut and also for clamping the tube to the rim.

An object of the invention is to provide a hollow tube disposed in a rim having a tubular stem connecting with the tube projecting through the rim with means for tightening up the clamping connection between the stem and the tube from the outside of the rim.

Another object of the invention is to provide a tube of the character described having a stem clamping nut projecting through the rim and a cap over the portion of the stem clamping nut on the outside of the rim having a driving connection with the nut whereby a nut threaded to the stem for clamping the tube to the rim acts through said cap and rotation of said cap results in turning of the stem clamping nut to tighten the connection between the stem and the tube.

Figure 2:
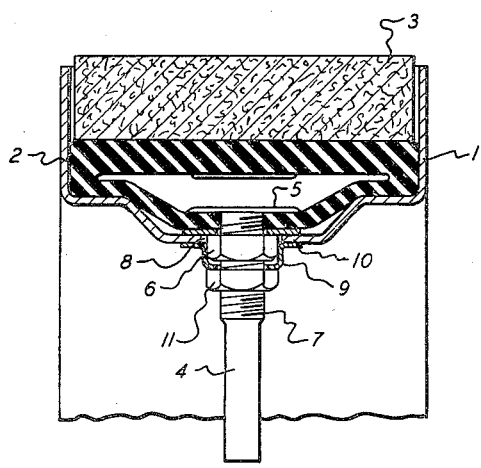
Figure 1:
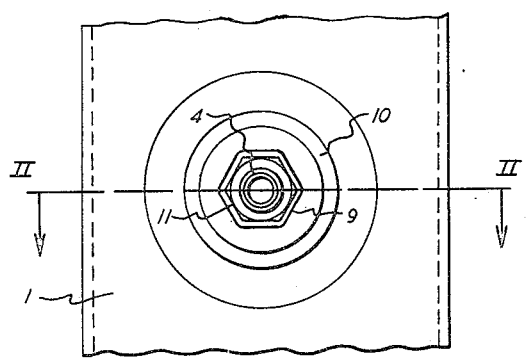

These and other objects residing in the arrangement, combination and construction of the parts will be apparent from the specification when taken with the accompanying drawing, wherein Fig. 1 is an elevation of a rim showing the hydraulic brake expander tube tubular stem projecting therethrough, and Fig. 2 is a section on the line II—II of Fig. 1.

Referring particularly to the drawing, the reference character 1 indicates a usual rim for supporting an annular hydraulic expander tube 2. The tube 2 is associated with a brake block or blocks 3 in the usual manner. Projecting through the rim 1 is a tubular stem 4 providing communication with the interior of the tube 2. The stem 4 is clamped to the tube 2 by drawing a base portion 5 thereof into clamping engagement with the interior of the tube 2 by a nut 6 threaded on the threaded portion 7 of the stem 4 adjacent the tube 2.

The rim 1 is provided with an enlarged opening 8 through which the stem 4 and nut 6 project. Disposed over the nut 6 is a sheet metal stamping 9 having the form of a hollow nut provided with an annular shoulder 10. The shoulder 10 bears against the outside of the rim 1. The interior side surfaces of the stamping 9 are complementary with the driving surfaces of the nut 6 and the stamping 9 and nut 6 are arranged in telescoping relation. It will appear that the stamping 9 constitutes an extension for the nut 6, making the same accessible for manipulation through a conventional wrench.

The tube 2 is clamped to the rim 1 by a nut 11 threaded to the stem 7 and bearing against the outer end of the stamping 9. The clamping action results from the tube 2 being drawn against the inside of the rim 1 by the nut 11, urging the shoulder 10 of the stamping 9 against the outside of the rim 1.

The outside of the stamping 9 is in the form of a nut and for convenience where the nut 6 is hexagonal the outside surface of the stamping 9 is hexagonal, such as for example, as shown in the drawing. Also, lateral dimensions of the nut 11 are less than those of the stamping 9.

In the event that the nut 6 becomes loosened and there is a leak between the stem 4 and the tube 2, the nut 6 may be tightened by merely applying a wrench to the outside of the stamping 9 to turn the nut 6 since the stamping 9 and the nut 6 are in driving relation with each other. This operation may be performed without removing the tube 2 from the rim 1. The operation is facilitated by the fact that the stamping 9 has larger lateral dimensions than those of the nut 11 so that a wrench applied to the outside of the stamping 9 will not be in driving contact with the nut 11. Following a tightening of the nut 6 through applying a turning force to the outside of the stamping 9, the nut 11 may be tightened to clamp the tube 2 tightly against the rim 1.

The invention has been defined as being particularly applicable to hydraulic brake expander tubes. However, it will be aparent that it will have equal application in the case of ordinary pneumatic or other tubes which have stems projecting through rims or the like and involve the same problems.

Having thus described my invention, what I desire to secure by Letters Patent and claim is:

1. The combination with a tube adapted to be supported on a rim having an opening therein and a tubular stem providing communication with the interior of said tube, said stem projecting through said opening, said stem having a threaded portion adjacent said tube and a nut on said threaded portion for clamping said stem to said tube, said nut projecting through said opening from the tube side of said rim to the outside thereof, of a hollow nut having an interior opening having driving surfaces complementary with the driving surfaces of said first named nut and telescoped thereon, said hollow nut being on the outside of said rim and having a shoulder bearing against the outside of said rim, said stem projecting through said hollow nut, and a third nut threaded to said stem and bearing against said hollow nut for clamping said hollow nut and tube against said rim, whereby said hollow nut may be turned from the outside of said rim to turn said first named nut to clamp said stem to said tube.

2. The combination with a tube adapted to be supported on a rim having an opening therein and a tubular stem providing communication with the interior of said tube, said stem projecting through said opening, said stem having a threaded portion adjacent said tube and a nut on said threaded portion for clamping said stem to said tube, said nut projecting through said opening from the tube side of said rim to the outside thereof, of a hollow nut having an interior opening complementary with said first named nut and telescoped thereon, said hollow nut being on the outside of said rim and having a shoulder bearing against the outside of said rim, said stem projecting through said hollow nut, and a third nut threaded to said stem and bearing against said hollow nut for clamping said hollow nut and tube against said rim, said third nut having smaller external lateral dimensions than said hollow nut, whereby said hollow nut may be turned from the outside of said rim to turn said first named nut to clamp said stem to said tube.

3. In a device of the character described, a rim, a tube supported on said rim, a stem secured to said tube, said stem having a threaded portion adjacent said tube and a nut on said threaded portion for clamping said stem to said tube, said rim having an opening therethrough through which said nut and stem project, a hollow nut having an interior opening having driving surfaces complementary with the driving surfaces of said first named nut and telescoped thereon, said hollow nut being on the outside of said rim and having a shoulder bearing against the outside of said rim, said stem projecting through said hollow nut, and a third nut threaded to said stem and bearing against said hollow nut for clamping said hollow nut and tube against said rim, whereby said hollow nut may be turned from the outside of said rim to turn said first named nut to clamp said stem to said tube.

4. In a device of the character described, a rim, a tube supported on said rim, a tubular stem providing communication with said tube, said rim having an opening therethrough, said stem having a threaded portion adjacent said tube, a nut on said threaded portion for clamping said stem to said tube, said nut projecting through said opening from the tube side of said rim to the outside thereof, extension means for said nut and means for clamping said extension means to said rim.

5. In a device of the character described, a rim, a tube supported on said rim, a tubular stem providing communication with said tube, said rim having an opening therethrough, said stem having a threaded portion adjacent said tube, a nut on said threaded portion for clamping said stem to said tube, said nut projecting through said opening from the tube side of said rim to the outside thereof, extension means for said nut and means for clamping said extension means to said rim.

CHARLES HOLLERITH.